United States Patent [19]
Pyle

[11] Patent Number: 6,035,969
[45] Date of Patent: Mar. 14, 2000

[54] GREASE GUN EXTENSION COUPLING DEVICE

[76] Inventor: Gary Lee Pyle, 405 Decatur, Chico, Tex. 76431

[21] Appl. No.: 09/139,551

[22] Filed: Aug. 25, 1998

[51] Int. Cl.⁷ .................................................... F01M 11/04
[52] U.S. Cl. ................................... 184/105.3; 184/105.2; 285/325
[58] Field of Search ............................. 184/105.1, 105.2, 184/105.3; 285/325; 141/383, 386

[56] References Cited

U.S. PATENT DOCUMENTS

| | | | |
|---|---|---|---|
| 1,929,628 | 10/1933 | Dodge | 285/325 |
| 1,962,254 | 6/1934 | Morris | 184/105.3 |
| 1,970,845 | 8/1934 | Dodge | 285/325 |
| 1,974,550 | 9/1934 | Tear et al. | 285/325 |
| 1,976,059 | 10/1934 | Dodge | 285/325 |
| 2,008,574 | 7/1935 | Bock | 285/325 |
| 2,123,404 | 7/1938 | Creveling | 184/105.3 |
| 4,195,812 | 4/1980 | Norcross | 251/148 |

FOREIGN PATENT DOCUMENTS 316238  11/1956  Switzerland ........................... 285/325

*Primary Examiner*—David A. Bucci
*Assistant Examiner*—Chong H. Kim
*Attorney, Agent, or Firm*—Felsman, Bradley, Vaden, Gunter & Dillon, LLP; Sidney L. Weatherford

[57] ABSTRACT

A coupling device is provided in which a substantially cylindrical grease delivery tube is nested within a substantially cylindrical engagement tube. The engagement tube has an aperture in the sidewall near the forward end of the engagement tube, for receiving a zerk fitting. The coupling device is positively connected to the zerk fitting by slipping the aperture, in the forward end of the engagement tube, over the zerk fitting. The neck of the zerk fitting is engaged by an inwardly-turned annular lip in the forward end of the cylindrical engagement tube. The rearward end of the engagement tube has internal threads which engage threads on an adapter that is threaded onto the grease delivery tube. As the adapter is rotated relative to the stationary, zerk fitting and the grease delivery tube, the coupling device is positively locked in position such that the forward end of the grease delivery tube is in a pressure fit, sealed connection to the face and check valve of the zerk fitting. No positive pressure is required by the operator to maintain positive, sealed connection with the zerk fitting.

10 Claims, 3 Drawing Sheets

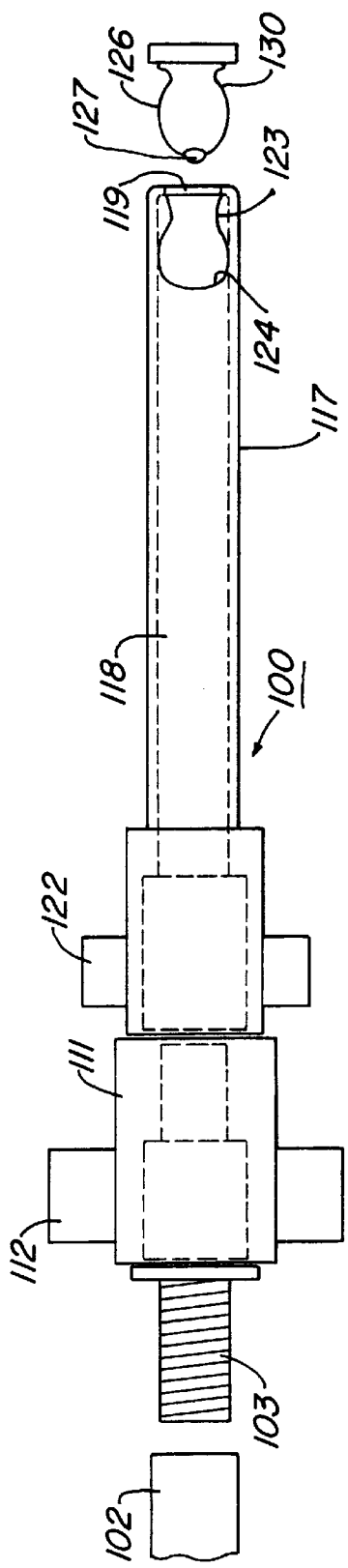
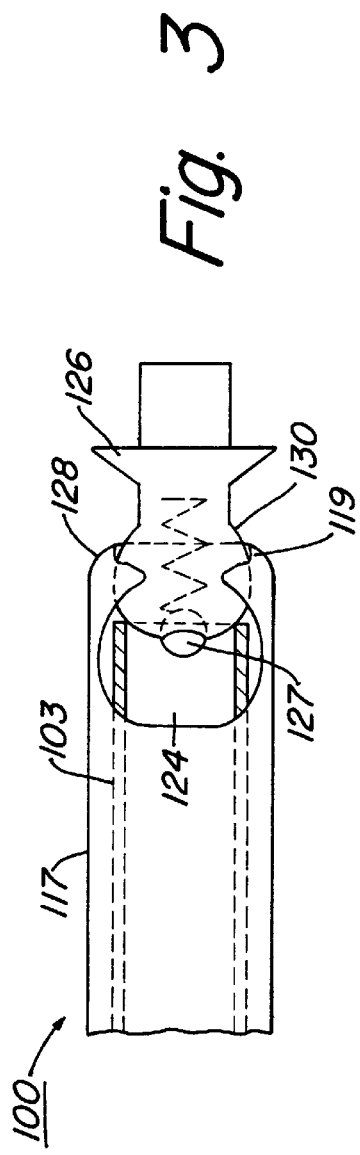

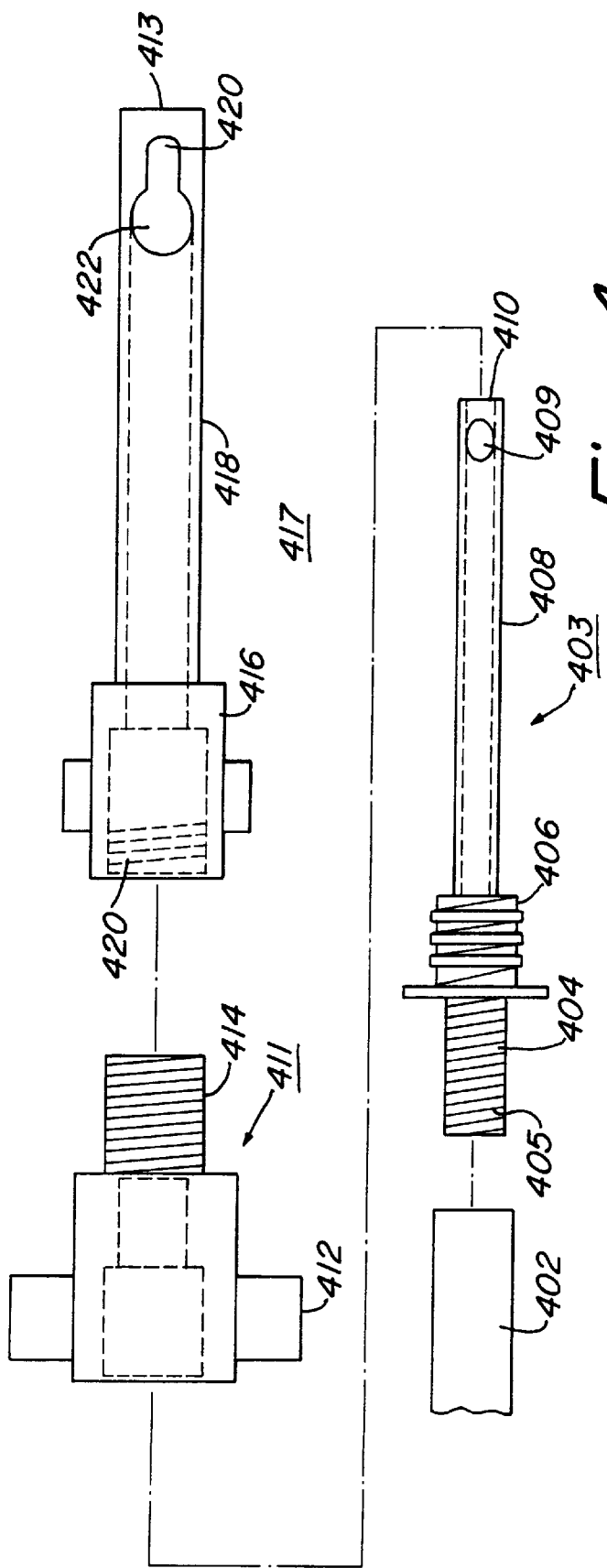

GREASE GUN EXTENSION COUPLING DEVICE

BACKGROUND OF THE INVENTION

1. Technical Field

The present invention relates in general to lubrication devices and in particular to coupling devices for connecting a lubrication device to grease fittings. Still more particularly, the present invention relates to improving the connection and ease of use of the lubrication device with difficult to reach grease fittings.

2. Description of the Related Art

Lubrication is necessary for extending the life of mechanical equipment with metal components that rotate or slide against other metal components. Rotating shafts and other moving parts in equipment that contact metal components during operation, require some means of reducing friction to extend the life of the equipment. Preventive maintenance, including lubrication of the moving parts, is essential to prolong effective operation of mechanical equipment. Regular lubrication is extremely important because old grease in a joint or rotating assembly accumulates acids and particles over time. Particles and acid generally damage the surfaces that the grease is intended to protect. Usually, the new lubricant forces out the old, contaminated lubricant providing clean, contaminant-free lubricant to the moving parts.

Machinery requiring grease lubrication generally has grease ("zerk") fittings installed in suitable locations on the equipment to apply the grease. "Zerk" has become a generic term for a nipple type fitting used to provide a lubrication point on mechanical equipment with moving parts. The fitting is usually ball-shaped with a spring loaded one way valve for receiving lubricant. The lubricant, under pressure, overcomes the spring pressure against the one way valve so the target part may receive new lubricant. Generally, the procedure is to inject enough lubricant, under pressure, through the zerk fitting, to literally exchange the old, contaminant laden lubricant for clean lubricant.

Mechanical equipment such as vehicles, conveyor systems, elevators, etc., all require lubrication because of moving parts having metal to metal contact. In the design of most mechanical equipment, zerk fittings are located in strategic positions on a rotating or sliding part to enable regular lubrication of the critical points. Usually, a regular maintenance schedule is suggested by the manufacturer to keep the equipment properly lubricated. However, though most fittings are mounted on the machinery in relatively accessible locations, machine design sometimes dictates that the fitting be located in a hard to reach location. This causes the responsible operator to sometimes skip lubrication of a particular fitting. If a part is not properly and regularly lubricated, premature failure of a part could result. Also, even though the fitting may be serviced regularly, difficulty in accessing a fitting may cause the coupling on the applicator to incorrectly engage the zerk fitting. Lubricant then flows around the fitting causing misapplication and loss of lubricant.

A lubrication applicator ("grease gun") must have a female coupler that will engage the zerk fitting so that grease from the grease gun, under pressure, overcomes the spring tension of the one way valve in the zerk fitting. When properly connected, grease is transferred through the one way valve and does not leak grease around the fitting.

In most grease gun coupler attachments, the coupling has to be aligned correctly with little variance or the grease will leak out between the coupler and the fitting. Also, the coupler must have positive pressure from the operator against the zerk fitting to ensure the efficient transfer of grease through the fitting. In other words, the operator must push the grease gun against the zerk fitting throughout the lubrication process. If the zerk fitting is in a hard to reach location, maintaining accurate placement of the grease gun coupler and positive pressure during the lubrication procedure, is difficult and usually transfers an insufficient amount of lubricant.

Those skilled in the art are aware of various extensions and couplers for grease guns. Mostly, such couplers or extensions slip over the fitting with a snap action. Generally, these couplings are easily dislodged and inadvertently release from the fitting if the coupler is slightly twisted or moved to an angle, slightly off perpendicular, on the zerk fitting. More often than not, the coupling must be applied to the zerk fitting in such a position that it cannot be held onto the fitting as required.

Positive lock couplings are known in the art, but the design is usually complicated and involves multiple mechanical parts that must work together to insure a positive lock and efficient transfer of lubricant. Usually, in these cases, the procedure for attaching the coupler to the fitting is complicated, unwieldy and the costs to manufacture are relatively high.

Poor maintenance procedures caused by hard to reach zerk fittings can cause very expensive damage due to poorly lubricated mechanical parts. Most often it is not the fault of the operator as the zerk fitting is in a hard to reach and usually hard to see location. The fittings in hard to reach locations may be dangerous to the operator. An operator may be required to blindly reach into the location to make the connection between the zerk and the grease gun. If the equipment engages during the time the operator is trying to connect the grease gun, at the very least the operator's hands are at risk and maybe his life.

It would be desirable, therefore, to provide a coupler for a grease gun, with a minimum number of parts, that would ensure positive connection to a zerk fitting regardless of the location of the fitting and without the need for positive pressure, during the lubrication procedure, from the operator. It would also be desirable that the device be easy to operate.

SUMMARY OF THE INVENTION

It is therefore one object of the present invention to provide a coupling device that would insure positive connection of a grease gun to a zerk fitting.

It is another object of the present invention to provide a coupling device that allows for relative ease in engaging a zerk fitting, by a grease gun, in hard to reach locations.

It is yet another object of the present invention to provide a coupling device that requires no positive pressure by an operator of the coupling device against a zerk fitting during a lubrication procedure.

It is a further object of the present invention to provide a coupling device that is simple to manufacture with a minimum number of parts.

It is yet another object of the present invention to provide a device that is easy to operate with minimal training.

The foregoing objects are achieved as is now described. A coupling device is provided in which a substantially cylindrical grease delivery tube is nested within a substantially cylindrical engagement tube. The engagement tube has an aperture in the sidewall near the forward end of the engagement tube, for receiving a zerk fitting. The coupling device is positively connected to the zerk fitting by slipping the aperture, in the forward end of the engagement tube, over the zerk fitting. The neck of the zerk fitting is engaged by an inwardly-turned annular lip in the forward end of the cylindrical engagement tube. The rearward end of the engagement tube has internal threads which engage threads on an adapter that is threaded onto the grease delivery tube. As the adapter is rotated relative to the stationary, zerk fitting and the grease delivery tube, the coupling device is positively locked in position such that the forward end of the grease delivery tube is in a pressure fit, sealed connection to the face and check valve of the zerk fitting. No positive pressure is required by the operator to maintain positive, sealed connection with the zerk fitting.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a side view of a coupling device in accordance with a preferred embodiment of the present invention.

FIG. 3 is an enlarged, partial sectional view of the coupling of FIG. 1 in engagement with a zerk fitting.

FIG. 4 is an exploded view of an alternate embodiment of a coupling device for engaging a zerk fitting at a ninety degree angle in accordance with a preferred embodiment of the present invention.

FIG. 5 is a side view, partially sectioned, of the coupling device of FIG. 4.

DETAILED DESCRIPTION OF THE PREFERRED EMBODIMENT

Figure 2:
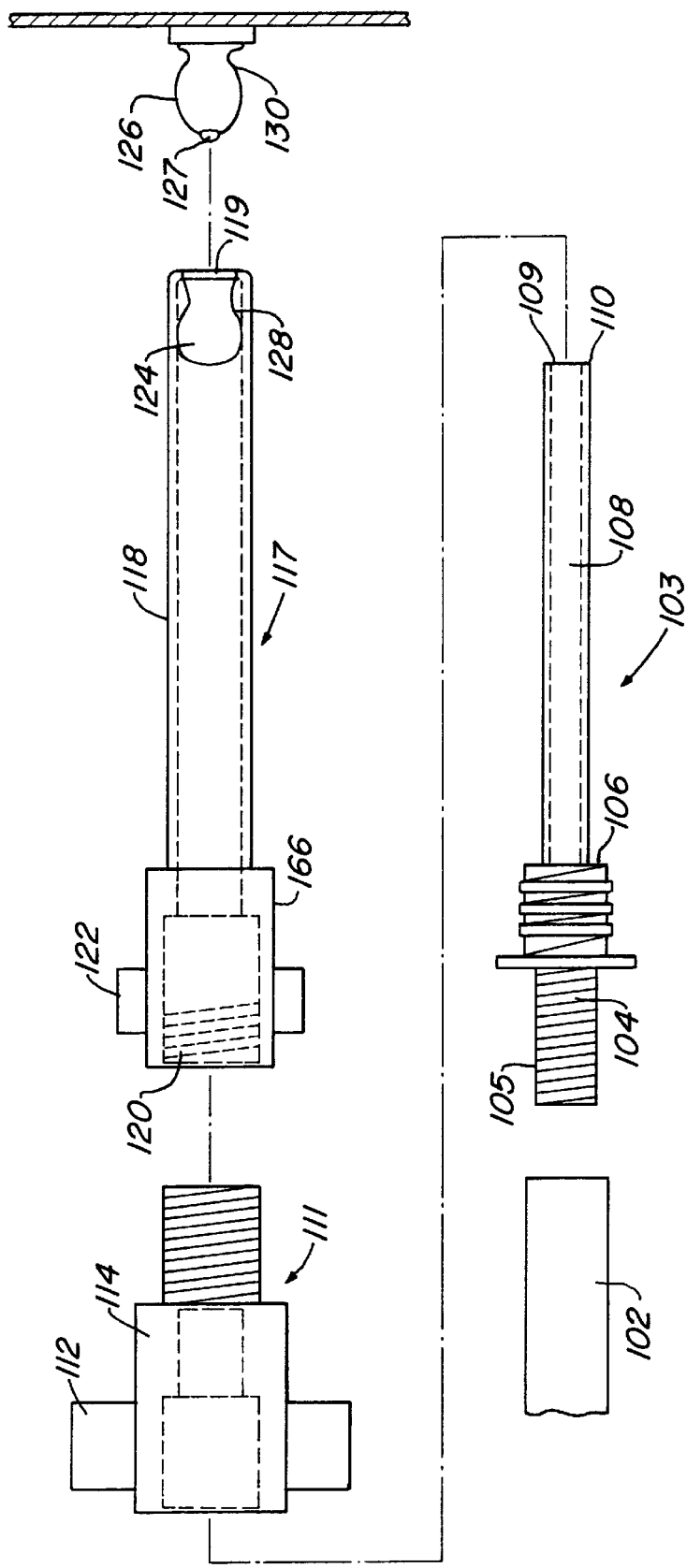
FIG. 2 is an exploded view of the coupling device of FIG. 1.

With reference now to the figures, and in particular with reference to FIG. 1, a side view of an assembled coupling device in accordance with a preferred embodiment of the present invention is depicted. Coupling 100 is comprised of a grease delivery tube 103, adapter 111 and a substantially cylindrical outer tube 117 having aperture 124, where aperture 124 is shaped for receiving a grease fitting, and a hole 119 in the forward end of cylindrical outer tube 117. Hole 119 joins aperture 124 and has an inner diameter smaller than the outer diameter of a spherical component 126 of a zerk fitting 125, but larger than a neck 130 component of zerk fitting 125.

A channel 123 separates aperture 124 from hole 119 in the forward end. Aperture 124 has a greater diameter than the diameter of spherical component 126 of zerk fitting 125. Channel 123 measures less than the diameter of spherical component 126, but greater than neck 130 of zerk fitting 125. Coupling 100 fits between, and connects a grease gun application tube 102 to zerk fitting 125, to transfer lubricant under fluid pressure from grease gun application tube 102 through zerk fitting 125.

Zerk fitting 125 is a ball shaped fitting having a neck 130 between ball 126 and shoulder 130 and a threaded portion (not shown) for connection to a mechanical device. Zerk fitting 125 may be threadably connected to a mechanical device (not shown) that contains movable or rotatable metal parts which make contact with each other. Zerk fitting 125 is well known to persons of skill in the art and it will be recognized that a check valve 127, normally closed, is an integral part of zerk fitting 125. Check valve 127 seals against contaminants and allows grease, under pressure, to flow into zerk fitting 125 but prevents grease from flowing out of zerk fitting 125.

Referring to FIG. 2, grease delivery tube 103 comprises a substantially cylindrical inner tube 108 with a forward end 110, having a hole 109, and cylindrical base 104 opposite forward end 110. Cylindrical base 104 is larger in diameter than substantially cylindrical inner tube 108. External threads 105 on cylindrical base 104 are for assembly with grease gun application tube 102, which includes internal threads (not shown). Threads 107 on forward portion 106 of cylindrical base 104 are for engaging adapter 111 with cylindrical base 104.

Grease delivery tube 103 may be threadably engaged with grease gun application tube 102 and hand tightened. Adapter 111 is threadably engaged with forward end 106 of grease delivery tube 103 and hand tightened. Further rotation of adapter 111, using tightening lugs 112, permits a sealing connection of grease delivery tube 103 to grease gun application tube 102.

Engagement tube 117 comprises cylindrical outer tube 118 with a forward open end 119, internal threads 120 inside rearward open end 116 for threadably and sealingly engaging external threads 114 on forward portion of adapter 111. As shown in FIG. 3, forward open end 119 of engaging tube 118 connects with zerk fitting 125 by passing zerk fitting 125 radially through aperture 124, rotating engagement tube 117 90°, subsequently shifting coupling 100 rearwardly until inwardly-turned annular lip 128 engages shoulder 130 of zerk fitting 125.

In operation, outer tube 117 may be rotated in relation to zerk fitting 125 from a position in which outer tube 117 is perpendicular to the axis of zerk fitting 125 to a position in axial alignment with zerk fitting 125. This induces forward open end 110 of grease delivery tube 108 into positive contact with a face of zerk fitting 125. Further hand tightening, using tightening lugs 122, causes the inwardly-turned annular lip 128 to bear rearwardly against rear portion of zerk fitting 125. Pressure induced by inwardly-turned annular lip 128 against the rear portion of zerk fitting 125 increases positive pressure of forward open end 110 of grease delivery tube 108 against the face and check valve 127 of zerk fitting 125. Grease under fluid pressure may then be delivered through grease gun application tube 102, grease delivery tube 108 and through check valve 127 into zerk fitting 125. Pressure against the face of zerk fitting 125 is maintained without further exertion by the operator until engagement tube 117 is loosened by reversing the rotation previously used to tighten engagement tube 117, using engagement tightening lugs 122.

Referring now to FIGS. 4 and 5, in this alternate embodiment a coupling device for engaging a zerk fitting at a ninety degree angle is depicted. Coupling 400 comprises a substantially cylindrical grease delivery tube 403, adapter 411 and a substantially cylindrical, right angle engagement tube 417. Grease delivery tube 403 comprises a substantially cylindrical inner tube 408 having a closed forward end 410, aperture 409 in the sidewall of inner tube 408, and a cylindrical base 404. The outer diameter of inner tube 408 is less than the inner diameter of right angle engagement tube 417 and when assembled, nests within right angle engagement tube 417. External threads 405 on cylindrical base 404, are for assembly with grease gun application tube 402 internal threads. External threads 406 on the forward end of cylindrical base 404 are for connecting adapter 411 with cylindrical base 404.

Grease delivery tube 403 may be threadably engaged with grease gun application tube 402. Adapter 411 is threadably engaged with external threads 406 of grease delivery tube 403 and provides a sealing, adjustable connection between grease delivery tube 403 and right angle engagement tube 417. Right angle engagement tube 417 comprises a substantially cylindrical outer tube 418, a shaped aperture 422 in the sidewall of outer tube 418, a closed forward end 413, a base 416, lugs 415 and internal threads 420 for threadably and sealingly engaging external threads 414 of adapter 411.

Aperture 422, in the sidewall of right angle engagement tube 417, is a circular hole of diameter greater than the diameter of the spherical portion 426 of zerk fitting 425. Elongated slot 420 joins aperture 422 and extends forward. Slot 420 has a width less than the diameter of spherical portion 426 of zerk fitting 425, but greater than the diameter of neck 430 of zerk fitting 425. The bore in engagement tube 418 has a cam surface 419 which inclines upward towards aperture 422, providing a ramp or incline for inner tube 408. Cam surface 419 is a portion of the sidewall of tube 418 opposite aperture 422.

The cam survace 419 causes aperture 409, in grease delivery tube 403, to positively engage the face of zerk fitting 426 and permits an increase in positive pressure by the forward portion of grease delivery tube 408 to zerk fitting 426. Aperture 422 is formed to allow zerk fitting 426 to pass perpendicularly through the side wall of right angle engagement tube 418 to engage opening 409 in grease delivery tube 403. Coupling 400 is then shifted rearwardly, causing extended slot 420 of right angle engagement tube 418 to engage neck 430 of zerk fitting 425 and force the face of zerk fitting 425 into positive pressure contact with opening 409 in grease delivery tube 403.

Pressure against zerk fitting 425 may be increased by rotating adapter 411 counter clockwise. This action will extend grease delivery tube 403 forward inside engagement tube 417, causing forward end 410 of grease delivery tube 403 to slide up the sloped surface 419 near forward end 413 of engagement tube 417, thus increasing pressure against the face of zerk fitting 426.

Grease may be forced under pressure through grease delivery tube 403, past check valve 427 and into zerk fitting 426. Removing coupling 400 from zerk fitting 426 is accomplished by pushing coupling 400 forward, thereby moving shoulder 430 of zerk fitting 426 out of extended slot 420 into the larger segment of shaped aperture 422. Coupling 400 may then be easily removed from zerk fitting 426.

This coupling device has advantages over previous attempts to solve the problem including: simplicity of design using a minimum number of parts (three), ease of attachment and the positive lock feature. When a connection is made to a zerk fitting, the positive lock feature assures little or no leakage of grease and no need to extend hands into a dangerous location.

While the invention has been particularly shown and described with reference to a preferred embodiment, it will be understood by those skilled in the art that various changes in form and detail may be made therein without departing from the spirit and scope of the invention.

What is claimed is:

1. A coupling device for connection to a zerk fitting to deliver grease, the zerk fitting having a ball shaped head and a neck, the coupling device comprising:

an outer tube;

an aperture in a forward end of the outer tube which has a first portion sized to receive the ball shaped head and an adjoining second portion sized to receive the neck but retain the ball shaped head;

an inner tube located within the outer tube, the inner tube having a hole proximal a forward end of the inner tube, the inner tube being rotatable relative to the outer tube and simultaneously axially movable relative to a longitudinal axis of the outer tube from a released position wherein the forward end of the inner tube is spaced rearward of the aperture in the outer tube to permit entry of the ball shaped head through the first portion of the aperture, to a locked position wherein the forward end of the inner tube engages the ball shaped head with the hole of the inner tube aligned with the ball shaped head.

2. The coupling device in claim 1, wherein the hole in the forward end of the inner tube is substantially circular and in a plane perpendicular to the longitudinal axis of the inner tube, having a center point on the longitudinal axis.

3. The coupling device in claim 1, wherein the first portion of the aperture is formed in a sidewall of the outer tube.

4. The coupling device in claim 3, wherein the first portion of the aperture is formed in the sidewall of the outer tube and the second portion of the aperture extends through the periphery of the forward end of the outer tube.

5. A coupling device for connection to a zerk fitting, comprising:

an outer tube having a substantially circular open forward end;

an aperture through a sidewall of the outer tube adjacent the open forward end, the aperture shaped to receive a ball-shaped portion of a zerk fitting, the aperture joining the open forward end;

an inwardly-turned lip around a periphery of the open forward end of the outer tube, forming a diameter at the open forward end less than a diameter of the ball-shaped portion;

an inner tube having a substantially circular open forward end wherein the open forward end of the inner tube is in a plane perpendicular to a longitudinal axis of the inner tube, having a centerpoint on the longitudinal axis and the inner tube is received within the outer tube; and wherein the inner tube is rotatable relative to the outer tube and axially movable within the outer tube to engage a face of the zerk fitting while within the outer tube, such that the ball-shaped portion of the zerk fitting is retained between the inwardly-turned lip and the forward end of the inner tube.

6. The coupling device of claim 5, wherein the open forward end of said inner tube is circular, is in a plane perpendicular to the longitudinal axis of the inner tube, and has a center point on the axis.

7. The coupling device of claim 1, wherein the inner tube has a rearward end adapted to be connected to a conduit for transferring lubricant under pressure.

8. The coupling device of claim 1, further comprising:

an adapter having an inner screw thread on a rearward end and an outer screw thread on a forward end;

an outer screw thread on a forward portion of a cylindrical base of the inner tube to sealingly engage the inner screw threads on the rearward end of the adapter; and an inner screw thread on a rearward end of the outer tube to sealing engage the outer screw threads on the forward end of the adapter.

9. A coupling device for connection to a zerk fitting having a face with a check valve, comprising:

an inner tube having a substantially circular opening in a forward end wherein the opening is in a plane perpendicular to a longitudinal axis of the inner tube and a centerpoint of the opening is on the longitudinal axis of the inner tube;

an outer tube having a substantially circular opening in a forward end wherein the opening of the outer tube has an inwardly turned lip around the periphery of the forward end, is in a plane perpendicular to a longitudinal axis of the outer tube, and has a centerpoint on the longitudinal axis of the outer tube;

an aperture in a sidewall of the forward end of the outer tube wherein the aperture has a first portion sized to receive a ball shaped head of a zerk fitting and a second portion sized to receive a neck of the zerk fitting but retain the ball shaped head and the second portion extends through the periphery of the forward end;

an adapter having an inner screw thread on a rearward portion for engaging an outer screw thread on a forward portion of a cylindrical base of the inner tube and an outer screw thread on a forward portion of the adapter for engaging an inner screw thread on a rearward portion of the outer tube; and wherein the inner tube is rotatable relative to the outer tube and is axially movable within the outer tube to engage the face of the zerk fitting while within the outer tube, such that the face of the ball shaped portion of the zerk fitting is sealingly retained between the inwardly-turned lip and the substantially circular opening in the forward end of the inner tube.

10. The coupling device of claim 9, wherein a longitudinal centerline of the aperture is aligned parallel to the longitudinal axis of the outer tube and the aperture is formed within a sidewall of the outer tube.

* * * * *